United States Patent
Herr

(10) Patent No.: US 11,181,186 B2
(45) Date of Patent: Nov. 23, 2021

(54) HANDHELD POWER TOOL GEARBOX UNIT

(71) Applicant: Robert Bosch GmbH, Stuttgart (DE)

(72) Inventor: Tobias Herr, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 395 days.

(21) Appl. No.: 15/500,661

(22) PCT Filed: Jul. 30, 2015

(86) PCT No.: PCT/EP2015/067500
§ 371 (c)(1),
(2) Date: Jan. 31, 2017

(87) PCT Pub. No.: WO2016/023761
PCT Pub. Date: Feb. 18, 2016

(65) Prior Publication Data
US 2017/0219087 A1    Aug. 3, 2017

(30) Foreign Application Priority Data

Aug. 12, 2014   (DE) .............................. 102014215967

(51) Int. Cl.
*F16H 57/08* (2006.01)
*B25F 5/00* (2006.01)
(Continued)

(52) U.S. Cl.
CPC ........... *F16H 57/082* (2013.01); *B25F 5/001* (2013.01); *F16C 19/06* (2013.01); *F16C 19/26* (2013.01);
(Continued)

(58) Field of Classification Search
CPC .................... F16H 57/082; F16H 2057/085
(Continued)

(56) References Cited

U.S. PATENT DOCUMENTS 8,298,114 B2 * 10/2012 Lopez ................... F16H 1/2836
475/347
9,879,608 B2 *  1/2018 Sheridan ................... F02C 7/16
(Continued)

FOREIGN PATENT DOCUMENTS

DE          2900189 A1    7/1979
DE     102011002406 A1    7/2012
(Continued)

OTHER PUBLICATIONS

International Search Report dated Nov. 24, 2015, of the corresponding International Application PCT/EP2015/067500 filed Jul. 3, 2015.

*Primary Examiner* — Anna K Kinsaul
*Assistant Examiner* — Daniel Jeremy Leeds
(74) *Attorney, Agent, or Firm* — Norton Rose Fulbright US LLP; Gerard Messina

(57) ABSTRACT

A handheld power tool gearbox unit, including at least one planetary gear stage, which includes at least one planet carrier, at least one planetary wheel, which is rotatably supported in relation to the planet carrier, and at least one bearing unit, which is provided to rotatably support the planetary wheel in relation to the planet carrier. The planetary wheel includes a pin, which rotatably supports the bearing unit in the planet carrier.

7 Claims, 8 Drawing Sheets

(51) Int. Cl.
*F16C 19/06* (2006.01)
*F16C 19/26* (2006.01)
*F16C 19/46* (2006.01)
*F16H 3/66* (2006.01)

(52) U.S. Cl.
CPC ............... *F16C 19/46* (2013.01); *F16H 3/66* (2013.01); *F16H 57/08* (2013.01); *F16C 2361/61* (2013.01); *F16H 2057/085* (2013.01); *F16H 2200/0034* (2013.01); *F16H 2200/201* (2013.01)

(58) Field of Classification Search
USPC ................................. 475/179, 332, 348, 903
See application file for complete search history.

(56) References Cited

U.S. PATENT DOCUMENTS

| | | | | |
|---|---|---|---|---|
| 2007/0078037 A1* | 4/2007 | Chang | ................ | F16H 57/0463 475/331 |
| 2008/0032850 A1* | 2/2008 | Ishizuka | ............... | F16H 57/082 475/331 |
| 2008/0045374 A1* | 2/2008 | Weinberg | ................. | B25J 9/102 475/342 |
| 2009/0215583 A1* | 8/2009 | Urakami | ................... | F16C 3/02 475/348 |
| 2010/0206110 A1* | 8/2010 | Minegishi | ............... | F16C 43/06 74/410 |
| 2013/0023371 A1* | 1/2013 | Yun | ....................... | F16H 57/082 475/149 |
| 2014/0031160 A1* | 1/2014 | Suzuki | ................... | H02K 7/116 475/149 |
| 2014/0148302 A1* | 5/2014 | Gieb | ....................... | F16H 35/02 475/334 |
| 2014/0287864 A1* | 9/2014 | Iizuka | ................... | F16H 57/043 475/159 |
| 2015/0240915 A1* | 8/2015 | Caiazzo | ................ | F16H 1/2836 475/347 |
| 2015/0330467 A1* | 11/2015 | Bourlon | ................ | B60T 13/745 475/149 |
| 2015/0354694 A1* | 12/2015 | Degenhart | ............. | B23P 15/14 475/331 |
| 2016/0116055 A1* | 4/2016 | Engblom | ............. | F16H 57/082 475/331 |

FOREIGN PATENT DOCUMENTS

| | | |
|---|---|---|
| EP | 0836902 A1 | 4/1998 |
| EP | 2612731 A1 | 7/2013 |
| JP | S5712148 A | 1/1982 |
| JP | H05332407 A | 12/1993 |

\* cited by examiner

HANDHELD POWER TOOL GEARBOX UNIT

BACKGROUND INFORMATION

A handheld power tool gearbox unit is described om German Patent Application No. DE 10 2011 002 406 A1, which has at least one planetary gear stage, which includes at least one planet carrier, at least one planetary wheel rotatably supported in relation to the planet carrier, and at least one bearing unit, which is provided to rotatably support the planetary wheel in relation to the planetary wheel carrier.

SUMMARY

The present invention is directed to a handheld power tool gearbox unit, having at least one planetary gear stage, which includes at least one planet carrier, at least one planetary wheel rotatably supported in relation to the planet carrier, and at least one bearing unit, which is provided to rotatably support the planetary wheel in relation to the planetary wheel carrier.

It is provided that the planetary wheel includes a pin, which rotatably supports the bearing unit in the planet carrier.

A particularly compact and light handheld power tool gearbox unit for a handheld power tool device having a high level of user comfort may be provided by an embodiment according to the present invention of the handheld power tool gearbox unit. A diameter of the bearing unit may be established, in a particularly advantageous way, independently of a diameter of the planetary wheel, whereby a robust handheld power tool gearbox unit having a high efficiency may be provided. A "planetary gear stage" is to be understood in particular as a gearbox unit which, in addition to the planet carrier and the at least one planetary wheel, includes an annulus gear, which is coupled toward the outside in the radial direction to the planetary wheel, and a sunwheel, which is coupled toward the inside in the radial direction to the planetary wheel. The planetary gear stage is preferably provided on the input side and/or on the output side for coupling to at least one further planetary gear stage. A "planet carrier" is to be understood in particular as an element which is provided to guide the at least one planetary wheel on an orbit around the sunwheel. The pin preferably has a rotation axis, which is situated in an installed state in parallel to a shared rotation axis of sunwheel, annulus gear, and planet carrier. The planetary gear stage preferably has a plurality of planetary wheels and a plurality of associated bearing units, which are situated distributed on the planet carrier in a circumferential direction of the planet carrier. It is possible that the planetary wheels are situated distributed uniformly in the circumferential direction. It is also possible that the planet carrier has different angular distances between the planetary wheels.

In one advantageous embodiment, the at least one bearing unit is designed as a roller bearing. A particularly low-friction bearing unit and a particularly efficient planetary gear stage may thus be provided. The roller bearing preferably has a plurality of rolling elements, which are situated at least partially in the planet carrier in an installed state, i.e., the planet carrier and the rolling elements overlap in the axial direction in the area of the bearing unit.

The planetary wheel advantageously includes a base body and a pin element, which forms the pin. A particularly simple and robust planetary wheel may thus be provided. A "pin element" is to be understood in this context in particular as an oblong element, which extends in an axial direction beyond the base body of the planetary wheel and is provided to connect the planetary wheel to the planet carrier.

Furthermore, it is provided that the base body and the pin element are least rotatably fixedly connected in a force-locked and/or form-fitted manner. A diameter of the planetary wheel may thus be selected largely independently of the bearing unit, whereby a particularly advantageous gear mechanism ratio of the planetary gear stage may be achieved and/or a particularly efficient planetary gear stage may be provided. In addition, the planetary wheel may be situated particularly precisely in relation to the planet carrier. A particularly precise and long-lived handheld power tool gearbox unit may be provided. The base body and the pin element preferably form an interference fit, i.e., a press fit for a force-locked connection, and/or the pin element engage(s) in the base body for a form-fitted connection and the base body and the pin element form a tight-fitting toothing. It is also possible that the base body and the pin element are integrally joined to one another, i.e., for example, by a welding process, a gluing process, and/or another process which appears reasonable to those skilled in the art, and/or advantageously molded in one piece, for example, by manufacturing from a cast, by sintering, or advantageously from a single blank, i.e., the planetary wheel is formed as one piece.

In one advantageous embodiment, the at least one bearing unit has an inner ring, which is formed as one piece with the pin. A particularly compact bearing unit and a particularly compact handheld power tool gearbox unit may thus be provided. The pin preferably forms a smooth and/or hardened radial inner running surface for the rolling elements of the bearing unit. "Radial" is to be understood in this context in relation to the rotation axis of the bearing unit.

In another advantageous embodiment, the at least one bearing unit has an outer ring, which is formed as one piece with the planet carrier. An overall size of the bearing unit may thus be further reduced and a particularly compact bearing unit and a particularly compact handheld power tool gearbox unit may be provided. The planet carrier preferably forms a smooth and/or hardened radial outer running surface for the rolling elements of the bearing unit.

Furthermore, it is provided that the at least one bearing unit is designed as a needle bearing. An overall size of the bearing unit may thus be further reduced and a particularly compact bearing unit and a particularly compact handheld power tool gearbox unit may be provided. A needle bearing is to be understood in this context in particular as a roller bearing, whose rolling elements are formed as oblong circular cylinders. The bearing unit preferably has a needle cage, which includes a rolling element cage and the rolling elements. It is also possible that the rolling elements are situated directly adjacent to one another in the circumferential direction and the rolling element cage is omitted.

In one advantageous embodiment, the at least one bearing unit is designed as a ball bearing. A particularly robust bearing unit may thus be provided.

The planetary wheel is advantageously designed as a gearwheel and has a root diameter and the bearing unit has a circular runway and/or slideway, whose diameter is at least 50% of the root diameter of the planetary wheel. A particularly low-friction and robust bearing unit may thus advantageously be provided independently of an extension of the planetary wheel. A "slideway" is to be understood in this context in particular as a circular path having a minimum diameter between two sliding surfaces of the bearing unit, one of which is formed by the planetary wheel and a further one of which is formed by the pin. A "runway" is to be understood in this context in particular as a path which the rolling elements of the bearing unit describe during a revolution about a rotation axis of the bearing unit. The runway is preferably defined by the path of a particular central point which is situated centrally between the radial inner and the radial outer running surfaces of the bearing unit for the rolling elements.

Furthermore, a handheld power tool device, in particular an electrical handheld power tool device, is provided, having at least one handheld power tool gearbox unit according to the present invention, which includes at least two planetary gear stages, which are designed similarly to one another. A particularly efficient, compact, and/or light handheld power tool device may thus be provided. Friction losses may be minimized. A handheld power tool device having high operating comfort may thus be provided.

The handheld power tool gearbox unit according to the present invention is not to be restricted in this case to the above-described application and specific embodiment. In particular, the handheld power tool gearbox unit according to the present invention may have a number of individual elements, components, and units which deviates from a number mentioned herein for fulfilling a functionality described herein.

BRIEF DESCRIPTION OF THE DRAWINGS

Further advantages result from the following description of the figures. Two exemplary embodiments of the present invention are shown in the figures. The figures and the description contain numerous features in combination. Those skilled in the art will advantageously also consider the features individually and combine them into reasonable further combinations.

DETAILED DESCRIPTION OF EXAMPLE EMBODIMENTS

Figure 1:
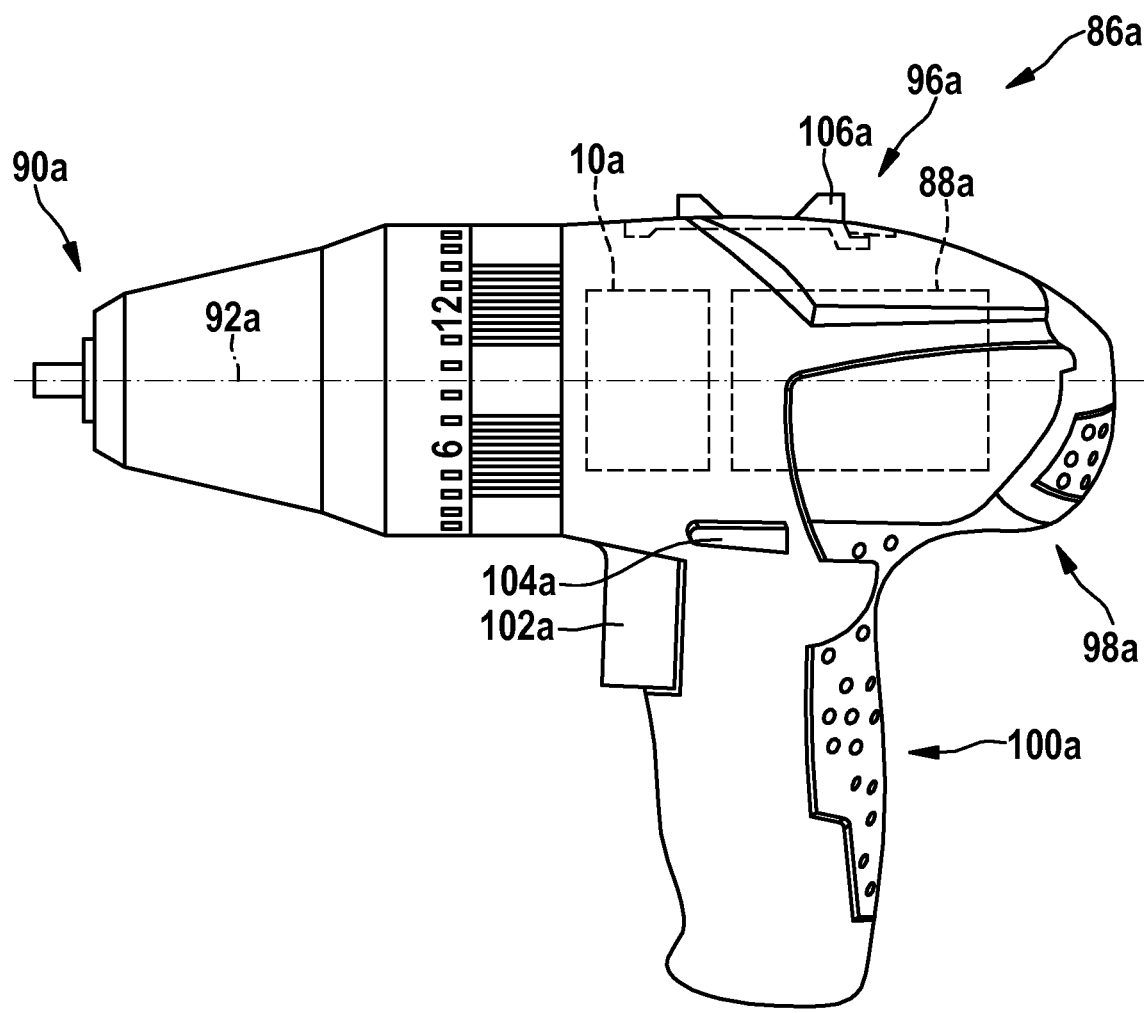
FIG. 1 shows a handheld power tool device having a handheld power tool gearbox unit according to the present invention.

FIGS. 1 through 4 show a handheld power tool device 86a, which is designed in the present exemplary embodiment as a cordless two-speed impact combi drill. Handheld power tool device 86a includes an electrical drive motor 88a, a handheld power tool gearbox unit 10a, and a tool receptacle 90a. Handheld power tool device 86a has a tool rotation axis 92a. Drive motor 88a, handheld power tool gearbox unit 10a, and tool receptacle 90a are situated in succession along tool rotation axis 92a. Tool receptacle 90a delimits handheld power tool device 86a in a working direction of handheld power tool device 86a. Handheld power tool gearbox unit 10a is situated between drive motor 88a and tool receptacle 90a. Handheld power tool gearbox unit 10a includes a gear mechanism input shaft (not shown in greater detail), which is attachable to drive motor 88a, and a gear mechanism output shaft 94a, which is attachable to tool receptacle 90a. Drive motor 88a is provided for converting electrical power into a rotational movement to drive a tool. Handheld power tool gearbox unit 10a is provided, at least in one operating state, to convert an input torque into an output torque and/or to convert an input speed into an output speed.

Handheld power tool device 86a includes a housing 96a, which supports drive motor 88a and handheld power tool gearbox unit 10a and protects them from environmental influences. Housing 96a includes a drive housing part 98a, which has a cylindrical basic shape and in which drive motor 88a and handheld power tool gearbox unit 10a are situated. Housing 96a furthermore forms a handle 100a of handheld power tool device 86a, which is situated laterally on drive housing part 98a in relation to tool rotation axis 92a. Handle 100a is provided for handling of handheld power tool device 86a by a user for operation of handheld power tool device 86a.

Handheld power tool device 86a includes a switch device, which is designed as an on/off switch device, and is provided to connect drive motor 88a of handheld power tool device 86a to a power source (not shown in greater detail) for operation. In the present exemplary embodiment, the switch device is provided to continuously set a torque and/or a speed. It is basically possible that the switch device is provided to set the torque and/or the speed in steps and/or to set the torque and/or the speed between a value of zero and a maximum value. The switch device has an operating element 102a, which is situated for operation by the user on the working direction side, i.e., on a side of handle 100a facing toward tool receptacle 90a.

Handheld power tool device 86a is provided in the present exemplary embodiment for operation in two rotational directions opposite to one another. Handheld power tool device 86a includes a switch device, which is designed as a rotational direction switch device. The rotational direction switch device has a sliding operating element 104a, which is situated so it is displaceable perpendicularly in relation to tool rotation axis 92a at a transition between drive housing part 98a and handle 100a. Sliding operating element 104a penetrates housing 96a in a direction perpendicular in relation to tool rotation axis 92a in an installed state.

Handheld power tool gearbox unit 10a has, in the present exemplary embodiment, two transmission stages, which each establish a speed ratio between gearbox output shaft 94a and the gearbox input shaft. Handheld power tool gearbox unit 10a is designed to be switchable and has two shift positions, which are each associated with one of the transmission stages. Handheld power tool device 86a includes a gearbox shift device for shifting handheld power tool gearbox unit 10a between the two shift positions. The gearbox shift device has a sliding operating element 106a. Sliding operating element 106a is situated on a side of drive housing part 98a facing away from handle 100a and is supported so it is displaceable in parallel to tool rotation axis 92a for operation by the user. Sliding operating element 106a has two shift positions, which are each associated with one of the shift positions of handheld power tool gearbox unit 10a.

Handheld power tool gearbox unit 10a is designed as a multistage planetary gear and has three planetary gear stages 12a, 14a, 16a in the present exemplary embodiment. Planetary gear stages 12a, 14a, 16a are situated staggered one after the other along tool rotation axis 92a, i.e., a first of planetary gear stages 12a is coupled to a further one of planetary gear stages 14a and further planetary gear stage 14a is coupled to a third of planetary gear stages 16a. First planetary gear stage 12a has a planet carrier 18a, a plurality of planetary wheels 24a, 26a, 28a, which are rotatably supported in relation to planet carrier 18a, and a plurality of bearing units 38a, 40a, 42a, which are each provided for rotatably supporting one of planetary wheels 24a, 26a, 28a in relation to planet carrier 18a. In the present exemplary embodiment, first planetary gear stage 12a has three planetary wheels 24a, 26a, 28a and three bearing units 38a, 40a, 42a. First planetary gear stage 12a furthermore includes a centrally situated sunwheel (not shown in greater detail) and an annulus gear 108a, which is situated fixed to the housing. The sunwheel, planet carrier 18a, and annulus gear 108a have a shared rotation axis, which is coincident in an installed state with tool rotation axis 92a. The sunwheel, planet carrier 18a, and annulus gear 108a are situated coaxially in relation to one another. Annulus gear 108a is situated fixed to the housing in the present exemplary embodiment and is formed by drive housing part 98a. The sunwheel is provided to introduce a torque of drive motor 88a into handheld power tool gearbox unit 10a. It is possible that the sunwheel is formed as one piece with the gearbox input shaft. The sunwheel is designed as a gearwheel and has external teeth. The sunwheel is designed as a spur gear. Planetary wheels 24a, 26a, 28a are each designed as gearwheels and each include external teeth having a root diameter. Planetary wheels 24a, 26a, 28a are designed as spur gears. The sunwheel and planetary wheels 24a, 26a, 28a mesh with one another in an operating state of handheld power tool device 86a. Planetary wheels 24a, 26a, 28a are provided to transmit a torque to planet carrier 18a. Planet carrier 18a is provided to divert a torque from first planetary gear stage 12a. Annulus gear 108a has internal teeth. Annulus gear 108a and planetary wheels 24a, 26a, 28a mesh with one another in an operating state.

Further planetary gear stage 14a includes, similarly to first planetary gear stage 12a, a planet carrier 20a, three planetary wheels 30a, 32a rotatably supported in relation to planet carrier 20a, and three bearing units 44a, which are each provided for rotatably supporting one of planetary wheels 30a, 32a in relation to planet carrier 20a. Further planetary gear stage 14a furthermore includes a centrally situated sunwheel 110a. Planet carrier 18a of first planetary gear stage 12a and sun wheel 110a of further planetary gear stage 14a are rotatably fixedly connected to one another. Planet carrier 18a of first planetary gear stage 12a and sunwheel 110a of second planetary gear stage 14a are formed as one piece with one another. Sunwheel 110a is provided for introducing a torque into further planetary gear stage 14a. Sunwheel 110a is designed as a gearwheel and has external teeth. Sunwheel 110a is designed as a spur gear.

Planetary wheels 30a, 32a are each designed as gearwheels and each include external teeth having a root diameter. Planetary wheels 30a, 32a are designed as spur gears. Sunwheel 110a and planetary wheels 30a, 32a mesh with one another in an operating state of handheld power tool device 86a. Planetary wheels 30a, 32a are provided for transmitting a torque to planet carrier 18a. Planet carrier 20a is provided for diverting a rotational movement from second planetary gear stage 14a. Further planetary gear stage 14a includes an annulus gear 112a. Sunwheel 110a, planet carrier 20a, and annulus gear 112a have a shared rotation axis, which is coincident with tool rotation axis 92a in an installed state. Sunwheel 110a, planet carrier 20a, and annulus gear 112a are situated coaxially in relation to one another. Annulus gear 112a has internal teeth. Annulus gear 112a and planetary wheels 30a, 32a mesh with one another in an operating state. Annulus gear 112a is provided for transmitting a torque to planetary wheels 30a, 32a in at least one operating state. Annulus gear 112a is designed as a shifting annulus gear. Annulus gear 112a forms a shift element of the gearbox shift device and is provided to set a desired transmission stage of handheld power tool gearbox unit 10a.

Figure 2:
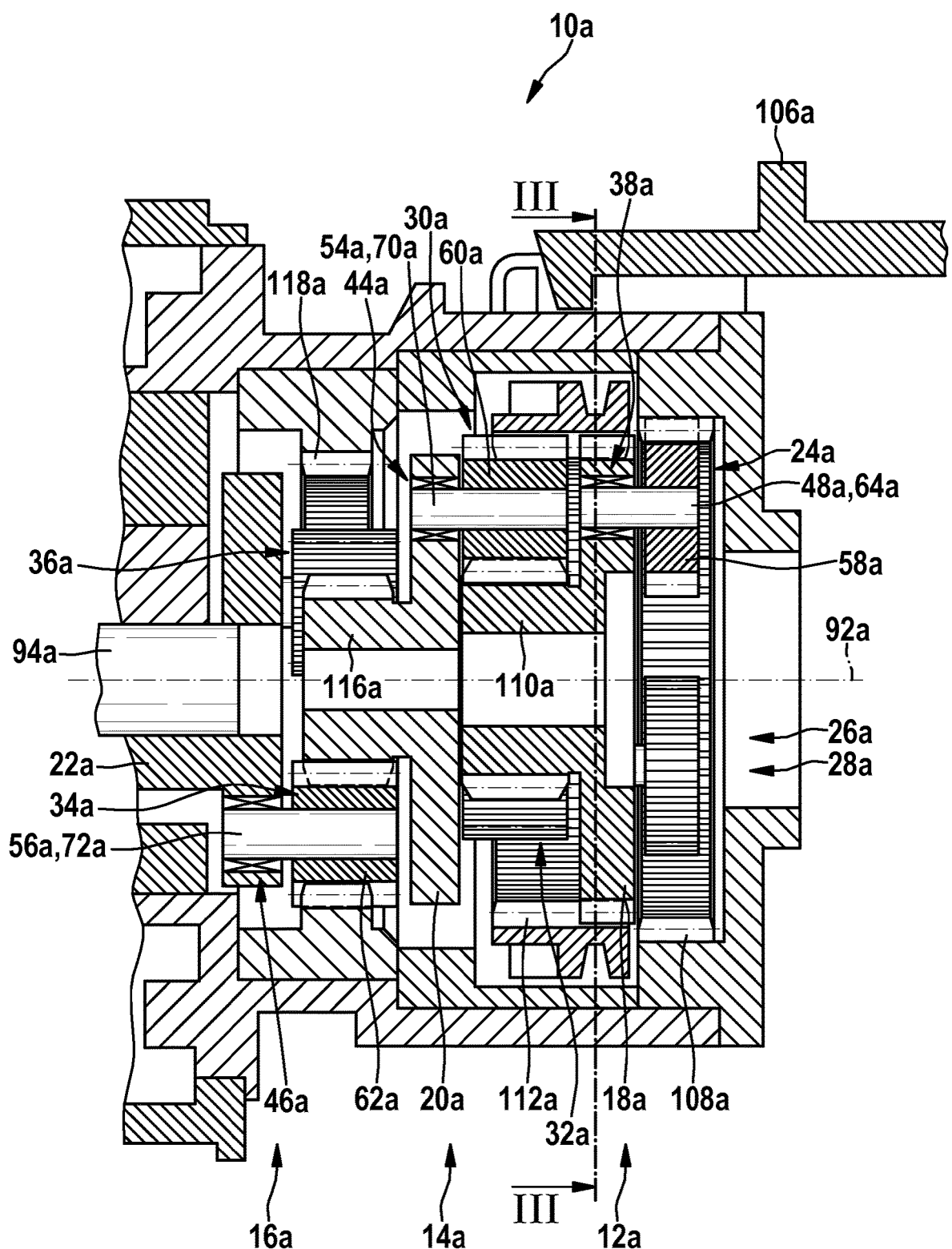
FIG. 2 shows a longitudinal section through the handheld power tool gearbox unit along a tool rotation axis.

The gearbox shift device has two shift states, which correspond to two different transmission stages of handheld power tool gearbox unit 10a. Annulus gear 112a has engagement means on a side facing toward gearbox output shaft 94a, which are provided to rotatably fixedly connect annulus gear 112a to drive housing part 98a in a first shift state. In the first shift state, annulus gear 112a is situated fixed to the housing. Planet carrier 18a of first planetary gear stage 12a and therefore sunwheel 110a of further planetary gear stage 12a are rotatable in relation to annulus gear 112a in the first switch state. In an operating state, planetary wheels 30a, 32a mesh with annulus gear 112a. Planet carrier 20a of further planetary gear stage 14a has a speed different from a speed of sunwheel 110a. FIG. 2 shows a further shift state, in which annulus gear 112a is situated displaced axially along tool rotation axis 92a in relation to its position in the first shift state. Annulus gear 112a has a greater distance in relation to gearbox output shaft 94a in comparison to the first shift state and the engagement means of annulus gear 112a are disengaged from drive housing part 98a. Annulus gear 112a is rotatably fixedly connected to planet carrier 18a of first planetary gear stage 12a and is therefore rotatably fixedly connected to sunwheel 110a of further planetary gear stage 14a. Planet carrier 18a has external teeth 114a, which are provided for interacting with corresponding internal teeth of annulus gear 112a in the further shift state and for rotatably fixedly connecting planet carrier 18a to annulus gear 112a. In the further shift state, annulus gear 112a, sunwheel 110a, and planet carrier 18a of further planetary gear stage 14a have identical speeds in an operating state.

Third planetary gear stage 16a includes, similarly to first planetary gear stage 12a and further planetary gear stage 14a, a planet carrier 22a, three planetary wheels 34a, 36a, which are rotatably supported in relation to planet carrier 22a, and three bearing units 46a, which are each provided to rotatably support one of planetary wheels 34a, 36a in relation to planet carrier 22a. Third planetary gear stage 16a furthermore includes a centrally situated sunwheel 116a. Planet carrier 22a of further planetary gear stage 16a and sunwheel 116a of third planetary gear stage 16a are rotatably fixedly connected to one another. Planet carrier 22a of further planetary gear stage 16a and sunwheel 116a of third planetary gear stage 16a are formed as one piece with one another. Sunwheel 116a is provided for introducing a rotational movement into third planetary gear stage 16a. Sunwheel 116a is designed as a gearwheel and has external gear teeth. Sunwheel 116a is designed as a spur gear. Planetary wheels 34a, 36a are each designed as gearwheels and each include external teeth 114a having a root diameter. Planetary wheels 34a, 36a are designed as spur gears. Sunwheel 116a and planetary wheels 34a, 36a mesh with one another in an operating state of handheld power tool device 86a. Planetary wheels 34a, 36a are provided for transmitting a rotational movement to planet carrier 22a. Planet carrier 22a is provided for diverting a torque from third planetary gear stage 16a and is rotatably fixedly connected to gearbox output shaft 94a. Third planetary gear stage 16a includes an annulus gear 118a. Sunwheel 116a, planet carrier 22a, and annulus gear 118a each have a shared rotation axis, which is coincident in an installed state with tool rotation axis 92a. Sunwheel 116a, planet carrier 22a, and annulus gear 118a are situated coaxially in relation to one another. Annulus gear 118a has internal teeth. Annulus gear 118a and planetary wheels 34a, 36a mesh with one another in an operating state.

Planetary wheels 24a, 26a, 28a, 30a, 32a, 34a, 36a are designed similarly to one another at least with regard to a support, because of which only planetary wheels 24a, 26a, 28a and bearing units 38a, 40a, 42a of first planetary gear stage 12a are described in greater detail. Planetary wheels 24a, 26a, 28a are situated in the present exemplary embodiment uniformly distributed in a circumferential direction of planet carrier 18a at an equal radial distance from the rotation axis of planet carrier 18a on planet carrier 18a. Planetary wheels 24a, 26a, 28a have a distance of 120° to a particular adjacent planetary wheel 36a in the circumferential direction of planet carrier 18a. Planetary wheels 24a, 26a, 28a each include a pin 48a, 50a, 52a, each of which supports one bearing unit 38a, 40a, 42a, which is associated with planetary wheel 24a, 26a, 28a, so it is rotatable in planet carrier 18a. Pins 48a, 50a, 52a of planetary wheels 24a, 26a, 28a are provided for connecting planetary wheels 24a, 26a, 28a to planet carrier 18a and for transmitting a torque to planet carrier 18a. Bearing units 38a, 40a, 42a are each designed as a roller bearing. Bearing units 38a, 40a, 42a are designed similarly to one another. Bearing units 38a, 40a, 42a each include an inner ring 74a, 76a, 78a and an outer ring 80a, 82a, 84a and each include a plurality of rolling elements 120a, 122a, 124a, which are situated in the radial direction between inner ring 74a, 76a, 78a and outer ring 80a, 82a, 84a. Inner rings 74a, 76a, 78a each form an inner running surface 126a and outer rings 80a, 82a, 84a each form an outer running surface 128a. In an operating state, rolling elements 120a, 122a, 124a run on inner running surfaces 126a and on outer running surfaces 128a. Inner rings 74a, 76a, 78a and outer rings 80a, 82a, 84a are situated within an axial extension of planet carrier 18a in the axial direction.

Planetary wheels 24a, 26a, 28a each include a base body 58a and a pin element 64a, 66a, 68a, which form pins 48a, 50a, 52a. Similarly, planetary wheels 30a, 32a of further planetary gear stage 14a and planetary wheels 34a, 36a of third planetary gear stage 16a each have a base body 60a, 62a and a pin element 70a, 72a, which forms a pin 54a, 56a. A first of bearing units 38a and a first planetary wheel 24a associated with bearing unit 38a of first planetary gear stage 12a are described in greater detail as representatives hereafter. Further bearing units 40a, 40a and planetary wheels 26a, 28a are designed similarly. Planetary wheel 24a has a rotation axis which is situated in parallel to tool rotation axis 92a. Base body 58a of planetary wheel 24a is disk-shaped and carries the external teeth of planetary wheel 24a. Pin element 64a is situated centrally in base body 58a. Pin element 64a and base body 58a are situated coaxially in relation to the rotation axis of planetary wheel 24a. Pin element 64a penetrates base body 58a of planetary wheel 24a and planet carrier 18a in an installed state. A length of pin element 64a corresponds in each case to at least a total of an axial extension of planet carrier 18a and an axial extension of base body 58a in the area of bearing unit 38a. It is also possible that a length of pin element 64a is less than the total of the axial extension of planet carrier 18a and an axial extension of base body 58a, and pin element 64a solely engages in base body 58a of planetary wheel 24a. Base body 58a and pin element 64a are rotatably fixedly connected to one another in a force-locked manner. Base body 58a and pin element 64a are connected to one another in a non-sliding manner. Pin element 64a is pressed into base body 58a in an installed state. Base body 58a has a central borehole for accommodating pin element 64a.

Inner ring 74a of bearing unit 38a is formed as one piece with pin 48a, i.e., pin 48a forms inner running surface 126a of bearing unit 38, which is in contact with rolling elements 120a and guides rolling elements 120a in an operating state. Outer ring 80a of bearing unit 38a is formed as one piece with planet carrier 18a, i.e., planet carrier 18a forms outer running surface 128a of bearing unit 38, which is in contact with rolling elements 120a and guides rolling elements 120a in an operating state. Planet carrier 18a includes a plurality of recesses 130a having a circular cross section in the axial direction and a central borehole 144a. Recesses 130a are situated distributed in an area in the form of a circular ring in the circumferential direction. A mass of planet carrier 18a is reduced by recesses 130a. Planet carrier 18a has a threefold symmetry in relation to tool rotation axis 92a with respect to an arrangement of bearing units 38a, 40a, 42a and recesses 130a.

Bearing unit 38a has a runway for rolling elements 120a, along which rolling elements 120a move in an operating state. The runway is circular and is situated concentrically in relation to pin 48a and the rotation axis of planetary wheel 24a, which is associated with bearing unit 38a. The runway has a diameter which is approximately 60% of the root diameter of planetary wheel 24a.

Figure 3:
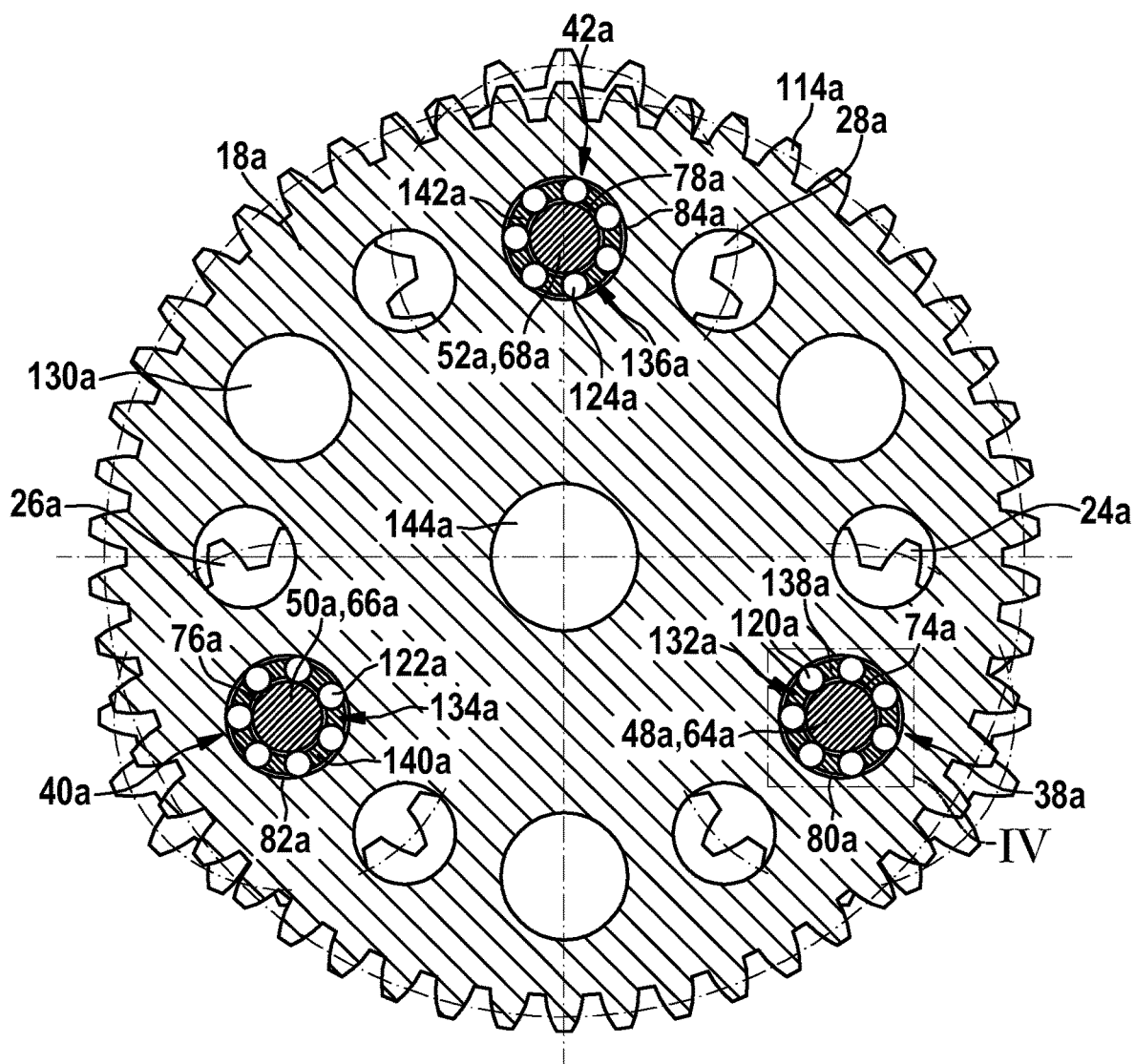
FIG. 3 shows a section along line III from FIG. 2 in the axial direction through a planet carrier of the handheld power tool gearbox unit.
Figure 4:
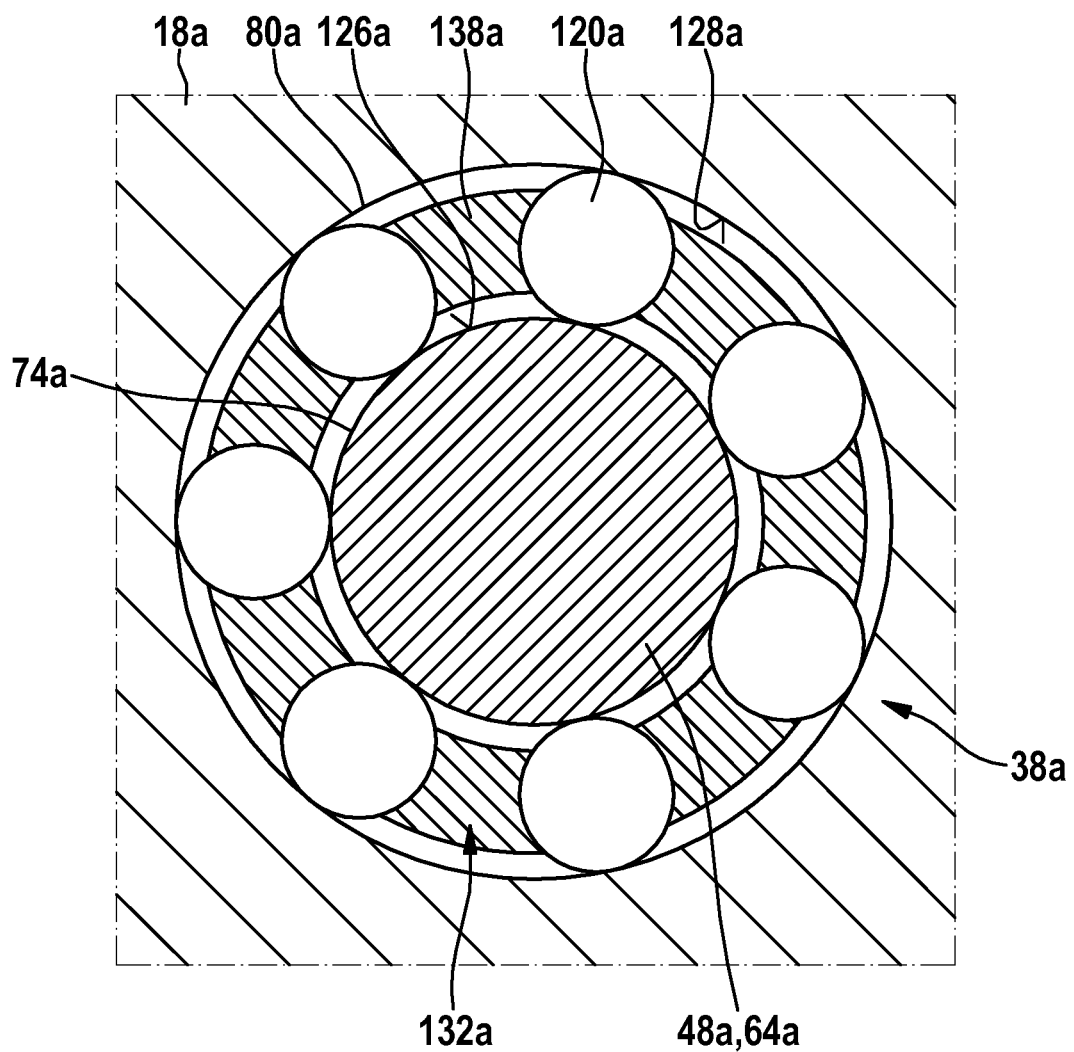
FIG. 4 shows a detail view for a portion IV of the section.

Bearing units 38a, 40a, 42a each have a rolling element cage 132a, 134a, 136a in the present exemplary embodiment, which is provided for establishing a distance of rolling elements 120a, 122a, 124a in relation to one another in the circumferential direction and guiding rolling elements 120a, 122a, 124a during a rotation of outer rings 80a, 82a, 84a in relation to inner rings 74a, 76a, 78a. Rolling element cages 132a, 134a, 136a have a plurality of web elements 138a, 140a, 142a, which are each situated between two rolling elements 120a, 122a, 124a. A number of web elements 138a, 140a, 142a corresponds in each case to a number of rolling elements 120a, 122a, 124a (FIG. 3 and FIG. 4).

FIGS. 5 through 8 show further exemplary embodiments of the present invention. The description below is generally restricted to the differences between the exemplary embodiments, reference also fundamentally being able to be made to the figures and/or the description of the other exemplary embodiments, in particular of FIGS. 1 through 4, with respect to identically labeled components, in particular with respect to components having identical reference numerals. To differentiate the exemplary embodiments, letter a is appended to the reference numerals of the exemplary embodiment in FIGS. 1 through 4. Letter a is replaced by letters b, c, and d in the exemplary embodiments of FIGS. 5 through 8.

Figure 5:
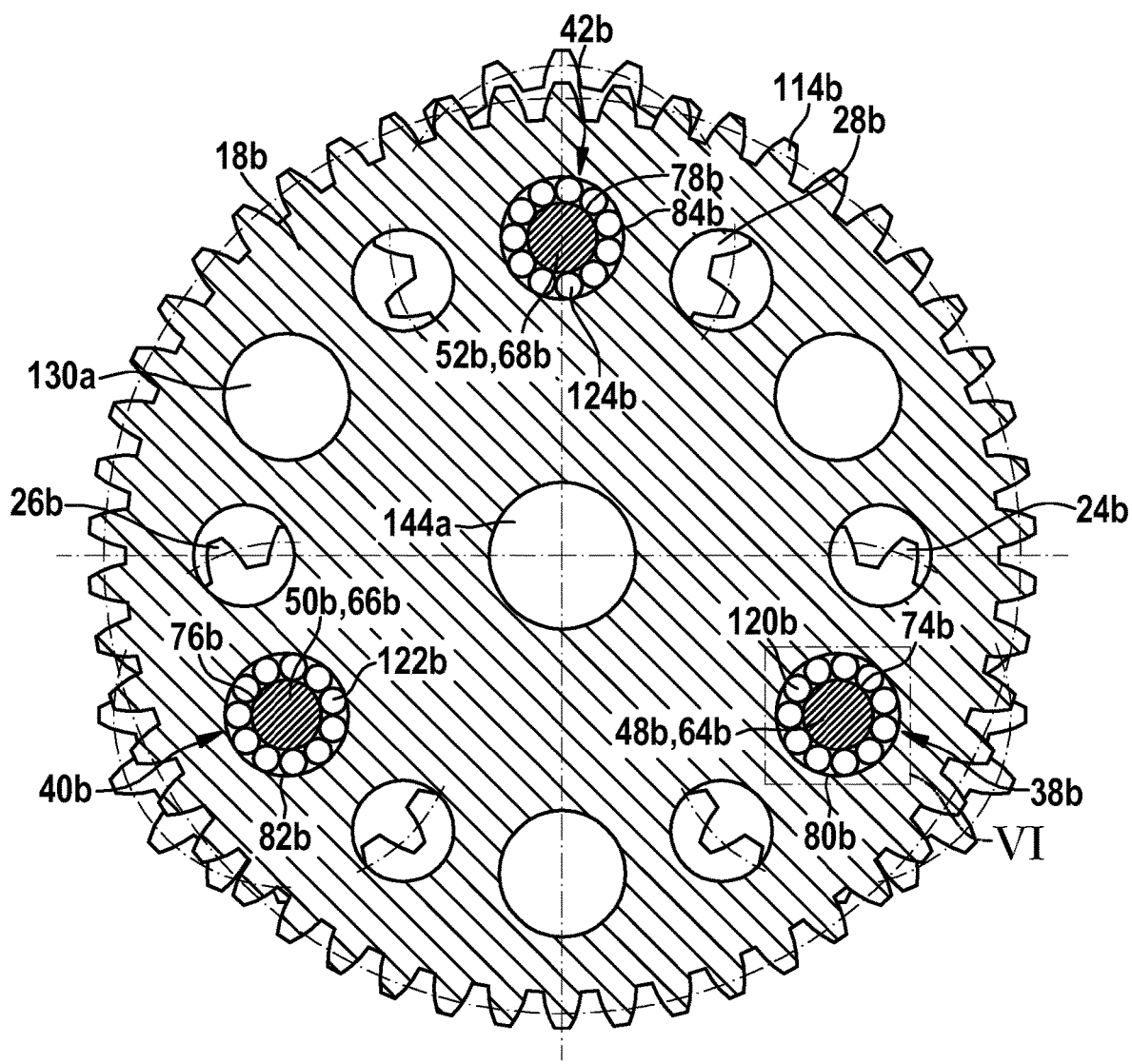
FIG. 5 shows a section along line III in the axial direction through a planet carrier for another exemplary embodiment.
Figure 6:
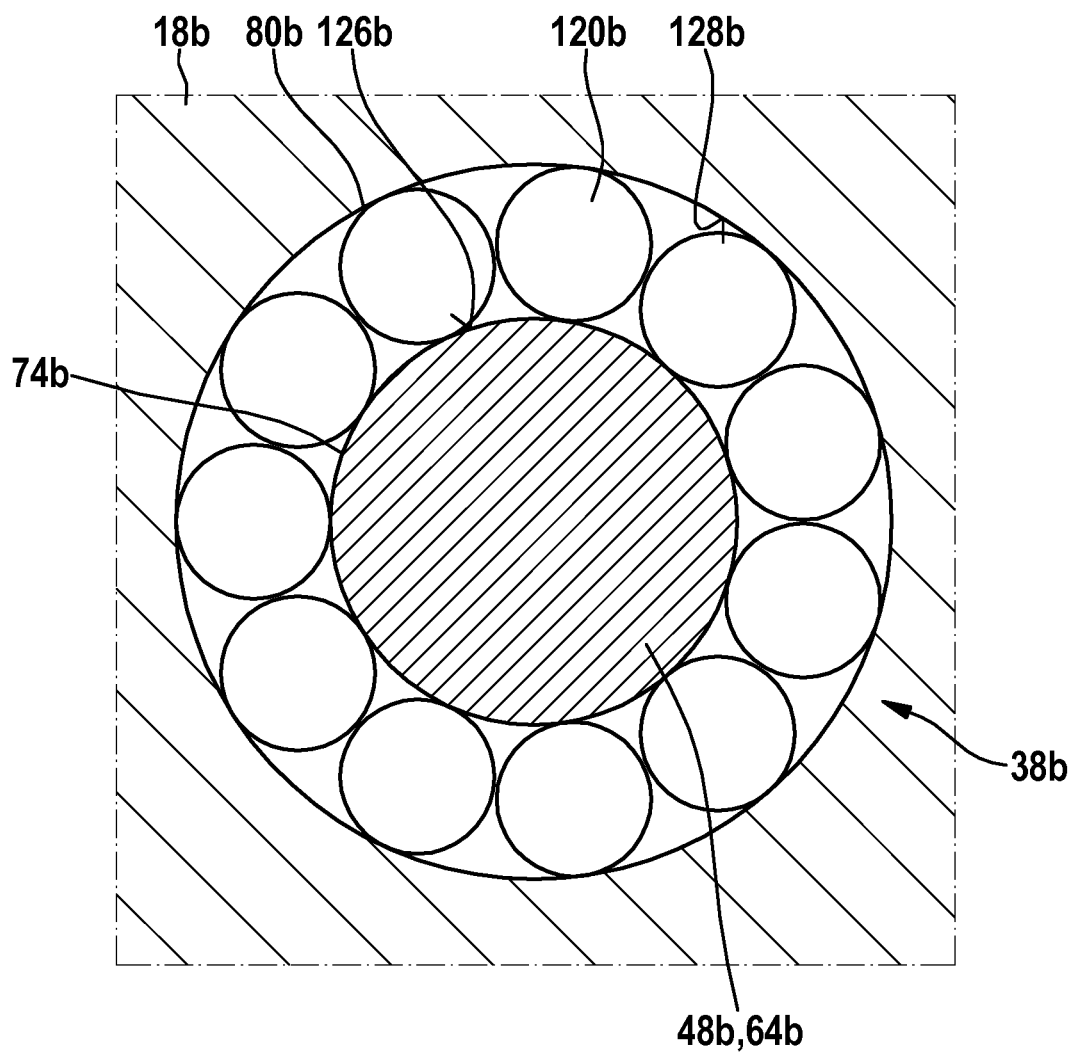
FIG. 6 shows a detail view for a portion VI of the section.

FIGS. 5 and 6 show a planet carrier 18b of a planetary gear stage for a handheld power tool gearbox unit. The handheld power tool gearbox unit is provided similarly to the preceding exemplary embodiment for a handheld power tool device (not shown in greater detail). The handheld power tool device has a tool receptacle, for example, for a screwdriver blade or a drill. The handheld power tool has a tool rotation axis.

The handheld power tool gearbox unit is designed similarly to the preceding exemplary embodiment as a multistage planetary gear and includes three planetary gear stages.

The planetary gear stages are situated staggered in succession along the tool rotation axis, i.e., a first of the planetary gear stages is coupled to a further one of the planetary gear stages and the further planetary gear stage is coupled to a third of the planetary gear stages. The first planetary gear stage has a planet carrier 18*b*, a plurality of planetary wheels 24*b*, 26*b*, 28*b*, which are rotatably supported in relation to planet carrier 18*b*, and a plurality of bearing units 38*b*, 40*b*, 42*b*, which are each provided to rotatably support one of planetary wheels 24*b*, 26*b*, 28*b* in relation to planet carrier 18*b*. The first planetary gear stage furthermore includes a centrally situated sunwheel (not shown in greater detail) and an annulus gear, which is situated fixed to the housing.

Planetary wheels 24*b*, 26*b*, 28*b* are situated uniformly distributed in a circumferential direction of planet carrier 18*b* at equal radial distance from the rotation axis of planet carrier 18*a* on planet carrier 18*b* in the present exemplary embodiment. Planetary wheels 24*b*, 26*b*, 28*b* have a distance of 120° to a particular adjacent planetary wheel 24*b*, 26*b*, 28*b* in the circumferential direction of planet carrier 18*b*. Planetary wheels 24*b*, 26*b*, 28*b* each include a pin 48*b*, 50*b*, 52*b*, each of which rotatably supports a bearing unit 38*b*, 40*b*, 42*b*, which is associated with planetary wheel 24*b*, 26*b*, 28*b*, in planet carrier 18*b*. Pins 48*b*, 50*b*, 52*b* of planetary wheels 24*b*, 26*b*, 28*b* are provided for connecting planetary wheels 24*b*, 26*b*, 28*b* to planet carrier 18*b* and for transmitting a torque to planet carrier 18*b*. Bearing units 38*b*, 40*b*, 42*b* are each designed as a roller bearing. Bearing units 38*b*, 40*b*, 42*b* are designed similarly to one another. Bearing units 38*b*, 40*b*, 42*b* each include an inner ring 74*b*, 76*b*, 78*b* and an outer ring 80*b*, 82*b*, 84*b*, and in each case a plurality of rolling elements 120*b*, 122*b*, 124*b* which are situated in the radial direction between inner ring 74*b*, 76*b*, 78*b* and outer ring 80*b*, 82*b*, 84*b*. Inner rings 74*b*, 76*b*, 78*b* each form an inner running surface 126*b* and outer rings 80*b*, 82*b*, 84*b* each form an outer running surface 128*b*. In an operating state, rolling elements 120*a*, 122*a*, 124*a* each roll on inner running surfaces 126*b* and on outer running surfaces 128*b*. Inner rings 74*b*, 76*b*, 78*b* and outer rings 80*b*, 82*b*, 84*b* are situated within an axial extension of planet carrier 18*b* in the axial direction.

Planetary wheels 24*b*, 26*b*, 28*b* each include a base body and a pin element 64*b*, 66*b*, 68*b*, which form pins 48*b*, 50*b*, 52*b*. Planetary wheels 24*b*, 26*b*, 28*b* each have a rotation axis, each of which is situated in parallel to the tool rotation axis.

Inner rings 74*b*, 76*b*, 78*b* of bearing units 38*b*, 40*b*, 42*b* are each formed in one piece with pins 48*b*, 50*b*, 52*b*, i.e., pins 48*b*, 50*b*, 52*b* each form inner running surface 126*b* of bearing units 38*b*, 40*b*, 42*b*, which are in contact with rolling elements 120*b*, 122*b*, 124*b* and guide rolling elements 120*a*, 122*a*, 124*a* in an operating state. Outer rings 80*b*, 82*b*, 84*b* of bearing units 38*b*, 40*b*, 42*b* are each formed in one piece with planet carrier 18*b*, i.e., planet carrier 18*b* forms outer running surfaces 128*b* of bearing units 38*b*, 40*b*, 42*b*, which are in contact with rolling elements 120*b*, 122*b*, 124*b* and guide rolling elements 120*a*, 122*a*, 124*a* in an operating state. Planet carrier 18*b* has a plurality of recesses 130*b* having a circular cross section in the axial direction and a central borehole 144*b*.

In contrast to the preceding exemplary embodiment, rolling elements 120*b*, 122*b*, 124*b* are situated directly adjacent to one another in the circumferential direction. Rolling elements 120*b*, 122*b*, 124*b* each fill up a space between inner rings 74*b*, 76*b*, 78*b* and outer rings 80*b*, 82*b*, 84*b* at least essentially completely, i.e., a mean value of a circumference of particular inner running surfaces 126*b* and a circumference of particular outer running surfaces 128*b* approximately corresponds to a total of the diameters of rolling elements 120*b*, 122*b*, 124*b*.

Figure 7:
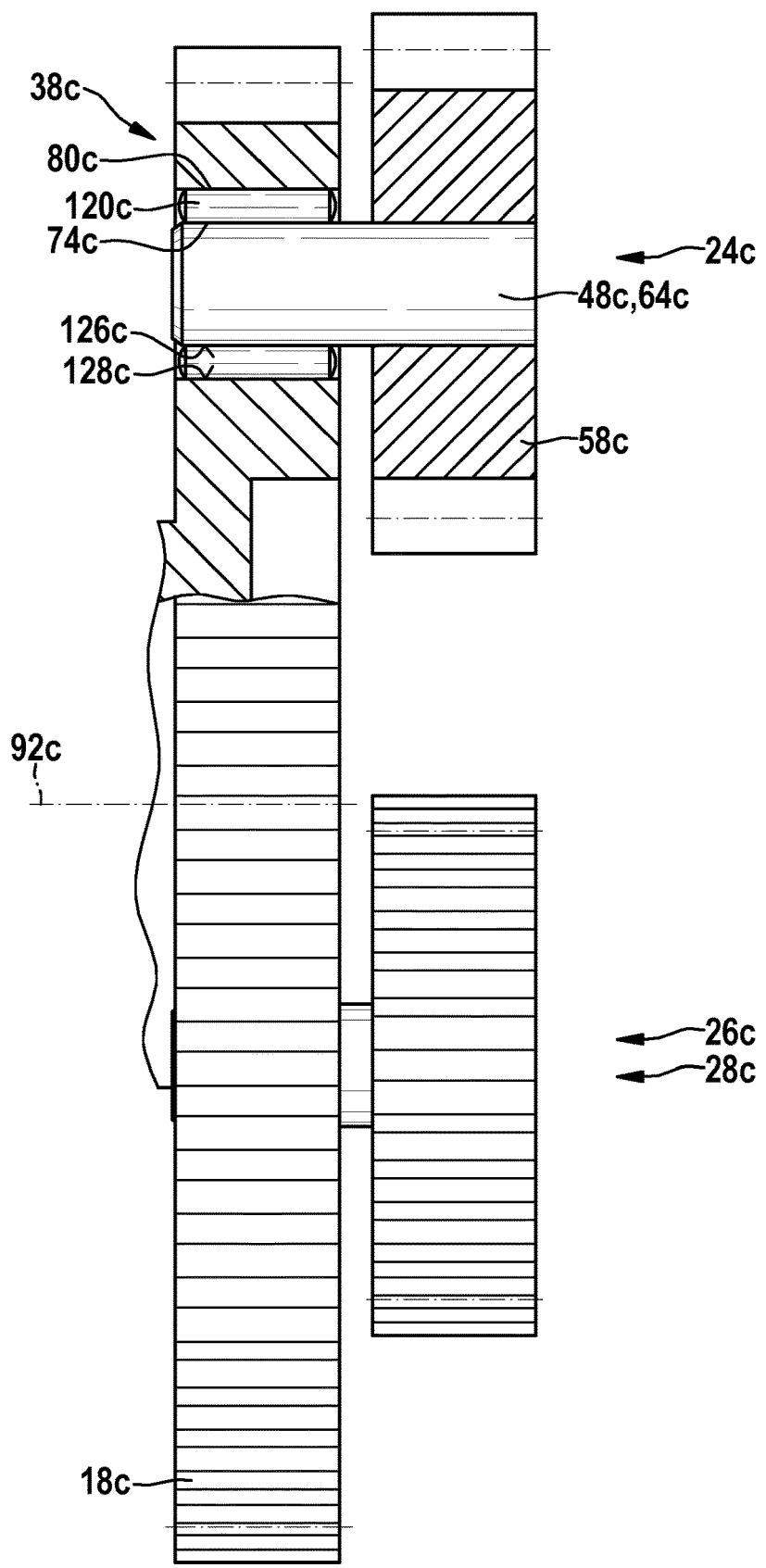
FIG. 7 shows a side view in partial section of a planet carrier for an exemplary embodiment including a needle bearing.

FIG. 7 shows another exemplary embodiment in a longitudinal section through a planet carrier 18*c* of a handheld power tool gearbox unit. The handheld power tool gearbox unit is provided similarly to the preceding exemplary embodiments for a handheld power tool device (not shown in greater detail). The handheld power tool device has a tool receptacle and a tool rotation axis 92*c*.

The handheld power tool gearbox unit is designed as a multistage planetary gear and includes three planetary gear stages in the present exemplary embodiment. The planetary gear stages are situated staggered in succession along tool rotation axis 92*c*, i.e., a first of the planetary gear stages is coupled to a further one of the planetary gear stages and the further planetary gear stage is coupled to a third of the planetary gear stages. The first planetary gear stage includes a planet carrier 18*c*, a plurality of planetary wheels 24*c*, 26*c*, 28*c*, which are rotatably supported in relation to planet carrier 18*c*, and a plurality of bearing units 38*c*, which are each provided to rotatably support one of planetary wheels 24*c*, 26*c*, 28*c* in relation to planet carrier 18*c*. In the present exemplary embodiment, the first planetary gear stage includes three planetary wheels 24*c*, 26*c*, 28*c* and three bearing units 38*c*. The first planetary gear stage furthermore includes a centrally situated sunwheel (not shown in greater detail) and an annulus gear, which is situated fixed to the housing. The sunwheel, planet carrier 18*c*, and the annulus gear have a shared rotation axis, which is coincident with tool rotation axis 92*c* in an installed state. The sunwheel, planet carrier 18*c*, and the annulus gear are situated coaxially in relation to one another. The annulus gear is situated fixed on the housing.

Planetary wheels 24*c*, 26*c*, 28*c* each include a pin 48*c*, which each rotatably support a bearing unit 38*c* associated with planetary wheel 24*c*, 26*c*, 28*c* in planet carrier 18*c*. Pins 48*c* of planetary wheels 24*c*, 26*c*, 28*c* are provided for connecting planetary wheels 24*c*, 26*c*, 28*c* to planet carrier 18*c* and transmitting a torque to planet carrier 18*c*. Bearing units 38*c* are each designed as a roller bearing. Bearing units 38*c* are designed similarly to one another. Bearing units 38*c* each have an inner ring 74*c* and an outer ring 80*c*, and each have a plurality of rolling elements 120*c*, which are situated in the radial direction between inner ring 74*c* and outer ring 80*c*. Inner rings 74*c* each form an inner running surface 126*c* and outer rings 80*c* each form an outer running surface 128*c*. In an operating state, rolling elements 120*c* roll on inner running surfaces 126*c* and on outer running surfaces 128*c*. Inner rings 74*c* and outer rings 80*c* are situated within an axial extension of planet carrier 18*c* in the axial direction.

A first of bearing units 38*c* with associated planetary wheel 24*c* is described hereafter as a representative. The further bearing units and planetary wheels 26*c*, 28*c* are designed similarly. Planetary wheel 24*c* includes a base body 58*c* and a pin element 64*c*, which forms pin 48*c*. Planetary wheel 24*c* has in each case a rotation axis, which is situated in parallel to tool rotation axis 92*c*. Base body 58*c* of planetary wheel 24*c* is disk-shaped and carries the external teeth of planetary wheel 24*c*. Pin element 64*c* is situated centrally in base body 58*c*. Pin element 64*c* and base body 58*c* are situated coaxially in relation to the rotation axis of particular planetary wheel 24*a*. Pin element 64*c* penetrates base body 58*c* of planetary wheel 24*c* and planet carrier 18*c* in an installed state. A length of pin element 64*c* corresponds in each case to at least a total of an axial extension of planet carrier 18*c* and an axial extension of base body 58*c* in the area of bearing unit 38d. It is also possible that a length of pin element 64c is less than the total of the axial extension of planet carrier 18c and an axial extension of base body 58c, and pin element 64c solely engages in base body 58c of planetary wheel 24c. Base body 58c and pin element 64c are rotatably fixedly connected to one another in a force-locked manner. Base body 58c and pin element 64c are connected to one another in a non-sliding manner. Pin element 64c is pressed into base body 58c in an installed state. Base body 58c has a central borehole for accommodating pin element 64c.

Inner ring 74c of bearing unit 38c is formed as one piece with pin 48c, i.e., pin 48c forms inner running surface 128c of bearing unit 38c, which is in contact with rolling elements 120c and guides rolling elements 120c in an operating state. Outer ring 80c of bearing unit 38c is formed as one piece with planet carrier 18c, i.e., planet carrier 18c forms outer running surface 128c of bearing unit 38c, which is in contact with rolling elements 120c and guides rolling elements 120c in an operating state.

Bearing unit 38c has a runway for rolling elements 120c, along which rolling elements 120c move in an operating state. The runway is circular and is situated concentrically in relation to pin 48c and the rotation axis of planetary wheel 24c, which is associated with bearing unit 38c. The runway has a diameter which is approximately 60% of the root diameter of planetary wheel 24c.

Bearing unit 38c is designed as a needle bearing in the present exemplary embodiment. Rolling elements 120c are designed similarly to one another. Rolling elements 120c are designed in the form of cylindrical rollers and each have a diameter and a rotation axis. Rolling elements 120c have an oblong shape and have an axial extension which is approximately four times the diameter. Bearing unit 38c has a rolling element assembly, which includes rolling elements 120c and a rolling element cage (not shown in greater detail). The rolling element cage is provided to keep a distance of rolling elements 120c constant in the circumferential direction. In an installed state, the rotation axes of rolling elements 120c are situated in parallel in relation to one another and to the rotation axis of planet carrier 18c. It is possible that the needle bearing is formed without a rolling element cage, similarly to the preceding exemplary embodiment. Furthermore, it is possible that inner ring 74c is formed separately from pin element 64c and outer ring 80c is formed separately from planet carrier 18c.

Figure 8:
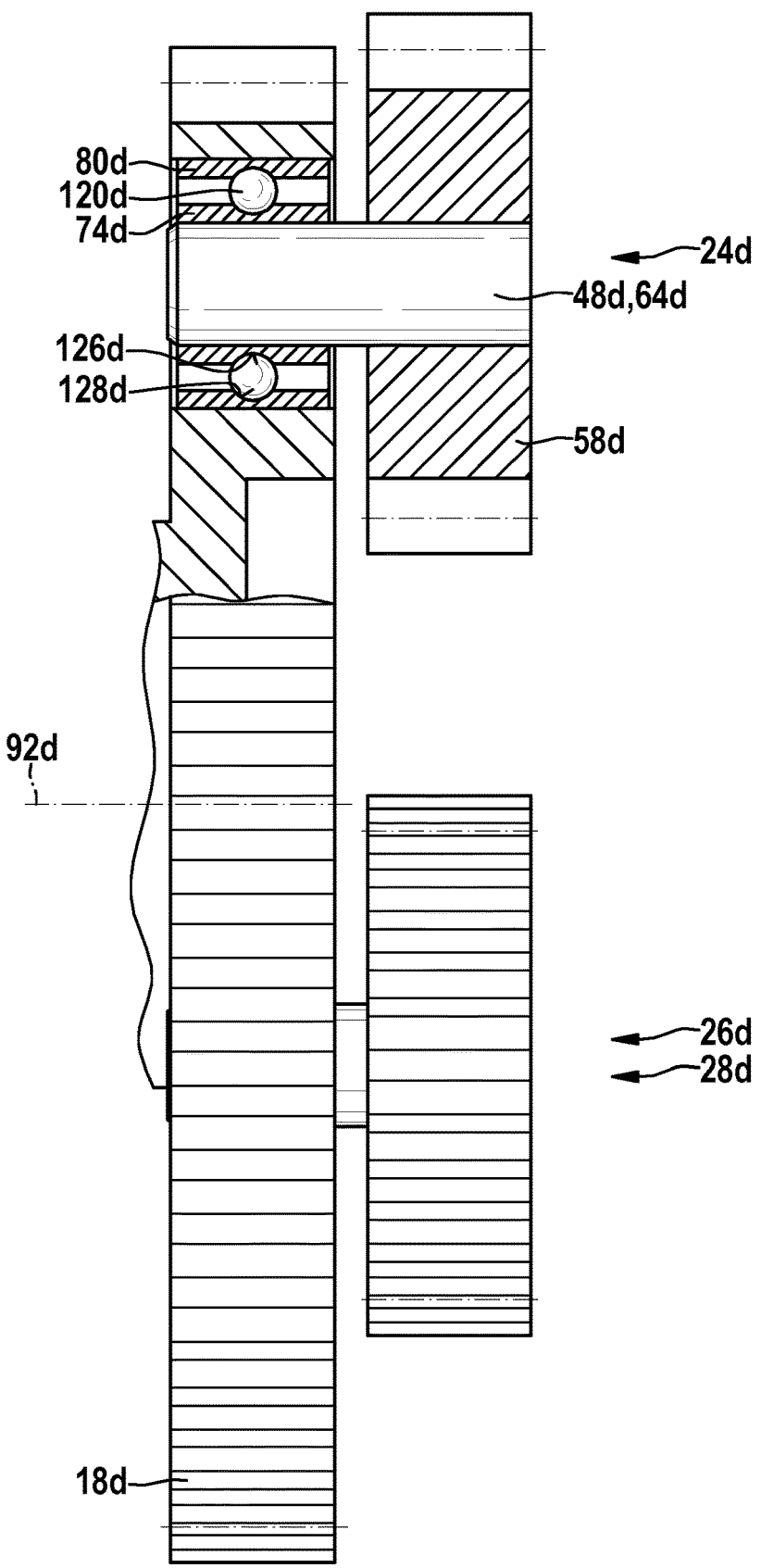
FIG. 8 shows a side view in partial section of a planet carrier for an exemplary embodiment including a ball bearing.

FIG. 8 shows a longitudinal section through a planet carrier 18d of a handheld power tool gearbox unit in another exemplary embodiment. The handheld power tool gearbox unit is provided, similarly to the preceding exemplary embodiments, for a handheld power tool device (not shown in greater detail). The handheld power tool device has a tool receptacle and a tool rotation axis 92d.

The handheld power tool gearbox unit is designed as a multistage planetary gear and includes three planetary gear stages in the present exemplary embodiment. The planetary gear stages are situated staggered in succession along tool rotation axis 92d, i.e., a first of the planetary gear stages is coupled to a further of the planetary gear stages and the further planetary gear stage is coupled to a third of the planetary gear stages. The first planetary gear stage includes a planet carrier 18d, a plurality of planetary wheels 24d, 26d, 28d, which are rotatably supported in relation to planet carrier 18d, and a plurality of bearing units 38d, which are each provided to rotatably support one of planetary wheels 24d, 26d, 28d in relation to planet carrier 18d. In the present exemplary embodiment, the first planetary gear stage includes three planetary wheels 24d, 26d, 28d and three bearing units 38d. The first planetary gear stage furthermore includes a centrally situated sunwheel (not shown in greater detail) and an annulus gear situated fixed to the housing. The sunwheel, planet carrier 18d, and the annulus gear have a shared rotation axis, which is coincident with tool rotation axis 92d in an installed state. The sunwheel, planet carrier 18d, and the annulus gear are situated coaxially in relation to one another. The annulus gear is situated fixed to the housing.

Planetary wheels 24d, 26d, 28d each include a pin 48d, each of which rotatably supports a bearing unit 38d, which is associated with planetary wheel 24d, 26d, 28d, in planet carrier 18d. Pins 48d of planetary wheels 24d, 26d, 28d are provided for connecting planetary wheels 24d, 26d, 28d to planet carrier 18d and transmitting a torque to planet carrier 18d.

A first of bearing units 38d will be described hereafter with associated planetary wheel 24d as a representative. The further bearing units and planetary wheels 26d, 28d are designed similarly. Planetary wheel 24d includes a base body 58d and a pin element 64d, which forms pin 48d. Planetary wheel 24d has a rotation axis, which is situated in parallel to tool rotation axis 92d. Base body 58d of planetary wheel 24d is disk-shaped and carries the external teeth of planetary wheel 24d. Pin element 64d is situated centrally in base body 58d. Pin element 64d and base body 58d are situated coaxially in relation to the rotation axis of particular planetary wheel 24a. Pin element 64d penetrates base body 58d of planetary wheel 24d and planet carrier 18d in an installed state. A length of pin element 64d corresponds in each case to a total of an axial extension of planet carrier 18d and an axial extension of base body 58d in the area of bearing unit 38d. It is also possible that a length of pin element 64d is less than the total of the axial extension of planet carrier 18d and an axial extension of base body 58d, and pin element 64d solely engages in base body 58d of planetary wheel 24d. Base body 58d and pin element 64d are rotatably fixedly connected to one another in a force-locked manner. Base body 58d and pin element 64d are connected to one another in a non-sliding manner. Pin element 64d is pressed into base body 58d in an installed state. Base body 58d has a central borehole for accommodating pin element 64d.

Bearing unit 38d includes an inner ring 74d and an outer ring 80d and a plurality of rolling elements 120d, which are situated in the radial direction between inner ring 74d and outer ring 80d. Inner ring 74d forms an inner running surface 126d and outer ring 80d forms an outer running surface 128d. In an operating state, rolling elements 120d run on inner running surface 126d and on outer running surface 128d. Inner ring 74d and outer ring 80d are situated within an axial extension of planet carrier 18d in the axial direction. In contrast to the preceding exemplary embodiment, inner ring 74d is formed separately from pin 48d. Pin 48d is permanently connected to inner ring 74d. Outer ring 80d is formed separately from planet carrier 18d. Outer ring 80d of bearing units 38d is permanently connected in each case to planet carrier 18d. Planet carrier 18d has a circular recess for accommodating the outer ring.

In contrast to the preceding exemplary embodiment, bearing unit 38d is designed as a ball bearing. Rolling elements 120d of bearing unit 38d are designed in the form of balls. Inner ring 74d and outer ring 80d each have a groove extending in a circumferential direction, which is provided for guiding rolling elements 120d in an operating state. The groove is situated centrally in inner ring 74*d* and outer ring 80*d* in each case in an axial direction.

Bearing unit 38*d* has a runway for rolling elements 120*d*, along which rolling elements 120*d* move in an operating state. The runway is circular and is situated concentrically in relation to pin 48*d* and the rotation axis of planetary wheel 24*d*, which is associated with bearing unit 38*d*. The runway has a diameter which is approximately 60% of the root diameter of planetary wheel 24*d*.

What is claimed is:

1. A handheld power tool gearbox unit, comprising:
at least one planetary gear stage which includes at least one planet carrier, at least one planetary wheel rotatably supported in relation to the planet carrier, and at least one bearing unit to rotatably support the planetary wheel in relation to the planet carrier; wherein the at least one bearing unit is situated on the planet carrier in a circumferential direction of the planet carrier;
wherein the planetary wheel includes a pin which rotatably supports the bearing unit in the planet carrier,
wherein the at least one bearing unit includes an inner ring which is integrally joined as one piece with the pin, wherein the inner ring forms an inner running surface of the at least one bearing unit,
wherein the at least one bearing unit includes an outer ring which is integrally joined as one piece with the planet carrier, wherein the outer ring forms an outer running surface of the at least one bearing unit,
wherein the at least one bearing unit is at least one of a ball bearing, a roller bearing, or a needle bearing,
wherein the at least one bearing unit includes a plurality of rolling elements situated directly adjacent to one another in a circumferential direction, wherein the rolling elements fill up a space between the inner ring and the outer ring such that a mean value of a circumference of the inner running surface and a circumference of the outer running surfaces approximately corresponds to a total diameter of the rolling elements.

2. The handheld power tool gearbox unit as recited in claim 1, wherein at least one bearing unit is a roller bearing.

3. The handheld power tool gearbox unit as recited in claim 1, wherein the planetary wheel includes a base body and a pin element, which forms the pin.

4. The handheld power tool gearbox unit as recited in claim 3, wherein the base body and the pin element are at least rotatably fixedly connected to one another in one of a force-locked and a form-fitted manner.

5. The handheld power tool gearbox unit as recited in claim 1, wherein at least one bearing unit is a needle bearing.

6. The handheld power tool gearbox unit as recited in claim 1, wherein the planetary wheel is a gearwheel and has a root diameter and the bearing unit includes at least one of a circular runway and a slideway, whose diameter is at least 50% of the root diameter of the planetary wheel.

7. An electric handheld power tool device, comprising:
at least one handheld power tool gearbox unit which includes at least two planetary gear stages, each of the at least two planetary gear stages including at least one planet carrier, at least one planetary wheel rotatably supported in relation to the planet carrier, and at least one bearing unit to rotatably support the planetary wheel in relation to the planet carrier, wherein the at least one bearing unit is situated on the planet carrier in a circumferential direction of the planet carrier, wherein the planetary wheel includes a pin which rotatably supports the bearing unit in the planet carrier,
wherein the at least one bearing unit includes an inner ring which is integrally joined as one piece with the pin, wherein the inner ring forms an inner running surface of the at least one bearing unit,
wherein the at least one bearing unit includes an outer ring which is integrally joined as one piece with the planet carrier, wherein the outer ring forms an outer running surface of the at least one bearing unit,
wherein the at least one bearing unit is at least one of a ball bearing, a roller bearing, or a needle bearing,
wherein the at least one bearing unit includes a plurality of rolling elements situated directly adjacent to one another in a circumferential direction, wherein the rolling elements fill up a space between the inner ring and the outer ring such that a mean value of a circumference of the inner running surface and a circumference of the outer running surfaces approximately corresponds to a total diameter of the rolling elements.

\* \* \* \* \*

UNITED STATES PATENT AND TRADEMARK OFFICE
CERTIFICATE OF CORRECTION

PATENT NO. : 11,181,186 B2
APPLICATION NO. : 15/500661
DATED : November 23, 2021
INVENTOR(S) : Tobias Herr Page 1 of 1

It is certified that error appears in the above-identified patent and that said Letters Patent is hereby corrected as shown below:

On the Title Page

In Item (30), replace:
"102014215967"
With:
--102014215967.9--

Signed and Sealed this
Eleventh Day of January, 2022

Drew Hirshfeld
*Performing the Functions and Duties of the*
*Under Secretary of Commerce for Intellectual Property and*
*Director of the United States Patent and Trademark Office*